United States Patent [19]

Hammond et al.

[11] 3,791,892

[45] Feb. 12, 1974

[54] CASTABLE POLYURETHANE COMPOSITE PROPELLANTS

[75] Inventors: Aubrey J. Hammond, Sacramento; Hyman R. Lobowitz, Redondo Beach, both of Calif.

[73] Assignee: The United States of America as represented by the Secretary of the Navy, Washington, D.C.

[22] Filed: Jan. 24, 1966

[21] Appl. No.: 522,779

[52] U.S. Cl. .................................. 149/19.4, 149/20
[51] Int. Cl. ............................................. C06d 5/06
[58] Field of Search ................................ 149/19, 20

[56] References Cited

UNITED STATES PATENTS

| 3,050,423 | 8/1962 | Hudson | 149/19 |
| 3,132,976 | 5/1964 | Klager et al. | 149/19 |
| 3,245,849 | 4/1966 | Klager et al. | 149/19 |
| 3,291,660 | 12/1966 | Oberth et al. | 149/19 |

*Primary Examiner*—Benjamin R. Padgett
*Attorney, Agent, or Firm*—R. S. Sciascia; J. A. Cooke

[57] ABSTRACT

A solid propellant with a polyurethane resin binder made from the reaction of a di-isocyanate compound and the condensation product of 1,2-polyoxybutylene glycol with an alkanedioic acid.

17 Claims, No Drawings

CASTABLE POLYURETHANE COMPOSITE PROPELLANTS

This invention pertains to solid propellants and more particularly to a novel, castable solid propellant of the composite type having improved physical properties.

A solid propellant which has been used in rocket motors is the so-called composite type and it generally comprises a solid oxidizer in an organic resin. Propellants of this type, however, have not generally been effective in large rocket motors such as the advanced Polaris plastic motor because they do not possess the required mechanical properties, i.e., high elongation and low modulus of elasticity.

Accordingly, it is an object of this invention to provide a novel solid propellant of the composite type having improved mechanical properties.

It is another object of this invention to provide a novel solid propellant that combines the properties of high elongation and low modulus of elasticity.

These and other objects will become more readily apparent from the reading of the following detailed description of the invention.

The objects of this invention are accomplished by providing a solid propellant of the composite type wherein the long chain polymeric component of the binder is 1,2—polyoxybutylene glycol or one of its hydroxy-terminated polyester derivatives.

More particularly, the objects of this invention are accomplished by providing a solid propellant comprising about 45–95 weight percent of solid oxidizer and about 5–55 weight percent of crosslinked polyurethane binder wherein the polyurethane is the reaction product of the above-mentioned glycol or polyester and an organic compound having as its sole reacting groups, two isocyanate groups. The term crosslinked polyurethane binder is used herein to include crosslinked polyurethane and any other conventional propellant ingredients, e.g., plasticizers, antioxidants, solid fuels, wetting agents, polymerization catalysts, reinforcing agents, metal oxides, resonance suppressors, burning rate catalysts, etc., that may be present.

The 1,2-polyoxybutylene glycol that may be used in this invention is commercially available and it is preferred that it have a molecular weight of at least 500. The hydroxy-terminated polyester derivatives that are generally employed in this invention are formed by condensing a 1,2-polyoxybutylene glycol with an alkanedioic acid, e.g., succinic, adipic, sebacic, etc., in the presence of a conventional condensation catalyst such as p-toluene sulfonic acid. The polyester derivatives having a molecular weight of at least about 2,000 are preferred with the hydroxy-terminated polyester formed by condensing polyoxybutylene glycol with sebacic acid giving expecially good results. Since any one of the well known condensation reactions for producing polyesters may be employed for producing the polyesters utilized in this invention, reaction details will not be set forth herein.

The polyurethane which forms the propellant binder is the reaction product of a polymeric component of the type described (glycol or polyester), a diisocyanate and a crosslinking agent, with the diisocyanate being used in at least a stoichiometric amount (based on the active hydrogen functionality of the polymeric component and crosslinking agent), with an excess up to 25 percent being preferred. The ratio of polymeric component to crosslinking agent will vary depending upon the degree of cure desired, said ratio (based on equivalents) generally varying between about 1:1 and 9:1.

The diisocyanates used in the invention may be any one of a wide variety of organic diisocyanates which are generally used in forming polyurethanes, including saturated and unsaturated; aliphatic or aromatic; open or closed chain; and if the latter, monocyclic or polycyclic; diisocyanates. The diisocyanates may or may not be substituted by groups that are substantially unreactive with isocyanate or hydroxyl groups, such as, for example, ketone, halogen, ester, sulfide, ether or nitro groups. Representative examples include:

a. Substituted and unsubstituted alkane diisocyanates such as:
  Ethylene diisocyanate;
  Trimethylene diisocyanate;
  Propylene-1,2-diisocyanate;
  Tetramethylene diisocyanate;
  Butylene-1,3-diisocyanate;
  Decamethylene diisocyanate;
  Octadecamethylene diisocyanate;
  2-chloro-propane-1,3-diisocyanate
  3,3-dinitro-pentane-1,5-diisocyanate; etc.

b. Substituted and unsubstituted alkene diisocyanates such as:
  1-propylene-1,2-diisocyanate;
  2-propylene-1,2-diisocyanate;
  1-butylene-1,2-diisocyanate;
  3-butylene-1,2-diisocyanate;
  1-butylene-1,3-diisocyanate;
  1-butylene-2,3-diisocyanate; etc.

c. Substituted and unsubstituted alkylidene diisocyanates such as:
  Ethylidene diisocyanate;
  Propylidene-1,1-diisocyanate;
  propylidene-2,2-diisocyanate; etc.

d. Substituted and unsubstituted cycloalkylene diisocyanates such as:
  Cyclopentylene-1,3-diisocyanate;
  Cyclohexylene-1,2-diisocyanate;
  Cyclohexylene-1,3-diisocyanate;
  Cyclohexylene-1,4-diisocyanate; etc.

e. Substituted and unsubstituted cycloalkylidene diisocyanates such as:
  Cyclopentylidene diisocyanates;
  Cyclohexylidene diisocyanate; etc.

f. Substituted and unsubstituted aromatic diisocyanates such as:
  m-Phenylene diisocyanate;
  o-Phenylene diisocyanate;
  p-Phenylene diisocyanate;
  1-methyl-2,4-phenylene diisocyanate;
  Naphthylene-1,4-diisocyanate;
  Diphenylene-4,4'-diisocyanate;
  2,4-tolylene diisocyanate;
  2,6-tolylene diisocyanate;
  4,4'-diphenylmethane diisocyanate;
  1,5-naphthalene diisocyanate;
  Methylene-bis-(4-phenylisocyanate);
  2,2-propylene-bis-(4-phenylisocyanate);
  Xylene-1,4-diisocyanate;
  Xylylene-1,3-diisocyanate;
  4,4'-diphenylenemethane diisocyanate;
  4,4'-diphenylenepropane diisocyanate;
  diphenyl-3,3'-dimethoxy-4,4'-diisocyanate;
  naphthalene-1,5-diisocyanate;

2,3-tolylene diisocyanate;
Chlorophenyl-2,4-diisocyanate;
diphenyl-3,3'-dichloro-4,4'-diisocyanate; etc.

g. Substituted and unsubstituted diisocyanates containing hetero-atoms such as:
   alkane ether diisocyanates, e.g. OCN—CH$_2$CH$_2$—O—CH$_2$CH$_2$—NCO, etc.
   pyridine diisocyanates, e.g. 2,3-pyridine diisocyanate, etc.
   nitraza alkylene diisocyanates, e.g. 3-nitrazapentane-1,5-diisocyanate, etc.

The preferred diisocyanates are toluene-2,4-diisocyanate, 3-nitrazapentane-1,5-diisocyanate and 1,6-hexane diisocyanate.

The crosslinking agents which are used either singularly or in combination with each other in this invention are chosen from the wide variety of polyfunctional compounds currently used for crosslinking polyurethanes. For example, compounds having as their sole reacting groups three or more groups capable of reacting with isocyanate groups, e.g., groups containing active hydrogen, are particularly effective in this invention. It is to be understood that these compounds may also contain groups that are relatively unreactive with isocyanate or hydroxy groups such as, for example, ketone, halogen, ester, sulfide or ether groups and the term sole reacting groups is not meant to exclude these groups. Representative compounds include: saturated aliphatic and aromatic polyhydric alcohols, such as 1,2,3-propanetriol (glycerol), 1,2,6-hexanetriol, trimethylolpropane, erythritol, pentaerythritol, rabitol, xylitol, sorbitol, mannitol, trimethylolphenol, trimethylolbenzene, and the like; polyhydric amines, such as trimethylolamine, triethanolamine, triisopropanolamine, tri-n-propanolamine, N,N,N',N'-tetrakis(2-hydroxypropyl) ethylene diamine (Quadrol), N(2-hydroxyethyl)-N,N',N'-tris(2-hydroxypropyl) ethylene diamine, and the like; esters of polyhydric alcohols and fatty acids, such as castor oil, glyceryl mono-, di-, and triricinoleate, glyceryl mono-, di-, and tri(12-hydroxystearate), pentaerylthritol mono-, di-, tri-, and tetraricinoleate, pentaerylthritol mono-, di-, tri-, and tetra(12-hydroxystearate), 2,3-dihydroxypropyl-12-hydroxy-stearate, 2,3-dihydroxy ricinoleate, and the like; alkylene oxide adducts of polyhydric alcohols, such as ethylene oxide adducts of glycerol, 1,2,6-hexanetriol, and pentaerylthritol, propylene oxide adducts of glycerol (NIAX Triol LG Series), propylene oxide adducts of 1,2,6-hexanetriol, (NIAX Triol LHT Series), and the like; condensation products of two or more polyhydric alcohols, such as condensation products of 1,2,6-hexanetriol and glycerol, and the like; polyhydric derivatives of sugars, such as the octakis (2-hydroxypropyl) derivative of sucrose (Hyprose SP80), and like derivatives of glycose; polyamines such as tri- and tetraamines including diethylene triamine, hexamethylene tetraamine; and the like.

It is generally desirable to also employ a polymerization catalyst of the type generally used in the polymerization of polyurethanes. As representative examples of these well-known catalysts there may be mentioned the organometals such as ferric acetylacetonate, dibutyl tin diacetate, titanyl acetylacetonate, vanadium acetylacetonate, vanadyl acetylacetonate, and the like.

The solid salts which are used either singularly or in combination with each other as the oxidizer in the propellant are employed in powdered form (average particle sizes usually range between 1 and 300 microns) and they representatively include the nitrates, perchlorates, chlorates, permanganates, chromates and dichromates of the alkali or alkaline earth metals; ammonia; hydrazine; or guanidine. As representative compounds there may be mentioned ammonium nitrate, ammonium perchlorate, sodium nitrate, potassium perchlorate, lithium chlorate, calcium nitrate, barium perchlorate, strontium chlorate, and the like, with ammonium perchlorate being preferred.

The propellant also preferably includes a solid fuel component in powdered form (average particle size usually ranges from about 1 to 200 microns) and from among the well-known solid fuels there may be mentioned metals such as aluminum, boron, magnesium, beryllium, etc.; metal alloys such as the aluminum alloys of boron, magnesium, manganese, zinc, copper, etc.; metal hydrides such as the hydrides of aluminum, beryllium, etc.; and the like. These solid fuels are used in concentrations consistent with good mixing characteristics (usually between about 2 and 30 weight percent of the propellant composition).

The propellant composition may also include, as mentioned above, other conventional propellant ingredients such as plasticizers, e.g., tricresyl and trioctyl phosphates, high energy acidic plasticizers like difluoroamino compounds [tris(difluoroaminoethoxy)-propane, etc.]; nitrate compounds (nitroglycerine, etc.); nitro compounds [bis(dinitropropyl) acetal of formaldehyde, etc.]; antioxidants, e.g., BLE (reaction product of acetone and diphenylamine), etc.; wetting agents, e.g., Lecithin, etc.; metal oxides, e.g., magnesium oxide, etc.; reinforcing agents, e.g., lignin, etc.; burning rate catalysts, e.g., copper chromite, etc.; resonance suppressors, e.g., carbon black, etc.; and the like. These additives generally do not comprise more than about 10 percent of the propellant composition.

It is to be understood that the above mentioned specific examples of diisocyanates, crosslinking agents, solid oxidizers, solid fuels, etc., are only representative examples of the wide variety of these components which may be utilized in this invention and they are not to be construed as limiting the invention in any manner.

The propellant is generally prepared by first heating and blending all ingredients, except the diisocyanate and solid components (oxidizer, fuel, etc.), under vacuum for a short period of time, e.g., 10 minutes. Subsequently, the solid component is blended into the mixture with heating under vacuum, followed by the addition of the diisocyanate. The resulting mixture is cast and cured (generally between about 60° and 200°F) into a solid propellant comprising a solid component dispersed in a polyurethane fuel binder. Alternatively, the propellant mixture can be cast and cured directly in a rocket chamber lined with an inert liner material.

The following examples are illustrative of the invention but its scope is not to be limited thereby.

EXAMPLE I

Six moles (3029.4 grams) of 1,2-polyoxybutylene glycol (B-500) from the Dow Chemical Company and two moles (400 grams) of sebacic acid from Eastman Kodak were polyesterified in the presence of 4 grams of p-toluene sulfonic acid as a condensation catalyst at 140° to 225°C. After eight hours of reacting time, a total of 76 cc of H₂O was collected with the last few cc's coming off during the last 2 hours of reacting time under 1 mm vacuum. The hydroxyterminated polyester of 1,2-polyoxybutylene glycol (B-500 sebacate diol) had an average molecular weight of 1150 and an acid number of .55.

It was desirable to increase the molecular weight of the polyester to 2,000 and to terminate the polymer in hydroxy groups. A charge containing 2,437 grams of B-500 sebacate diol with a molecular weight of 1,150 and 170 grams sebacic acid was added and reacted for 5½ hours at 210° to 225°C. A total of 30 cc of H₂O was collected with a water trap after 5½ hours at 210°–225°C.

The B-500 sebacate diol obtained had an average molecular weight of 2,266 and an acid number of 1.39.

EXAMPLE II

A solid propellent was formed from the following composition:

| Components | 80% solids/wt. % |
|---|---|
| NH₄ClO₄ | 65.00 |
| Aluminum (Alcoa 123) | 10.50 |
| Aluminum (Alcoa 140) | 4.50 |
| Cu 020 (copper chromite) | 0.10 |
| P-33 (carbon black) | 0.10 |
| BLE | 0.20 |
| Lecithin | 0.20 |
| B-500 sebacate diol of Ex. 1 | 8.466 |
| ECD-164-[Poly(1,4-butylene glycol) MW=1600] | 7.775 |
| Triethanol Amine | 0.227 |
| LHT-240-[1,2,6-hexanetriol initiated polypropylene glycol MW=760] | 0.469 |
| Toluene-2,4,-diisocyanate | 2.413 |
| Ferric acetylacetonate | 0.05 |
| | 100.00 |

All of the ingredients except tha ammonium perchlorate and diisocyanate were placed in a mixer and mixed for 15 minutes under 1 mm of vacuum at about 82°F. The ammonium perchlorate was then added and mixed for 10 minutes at about 82°F without vacuum. The mixing was then continued for 25 minutes at about 82°F with a vacuum. The diisocynate was then added and mixed at about 82°F under vacuum for a total of about 25 minutes. The propellant composition was cast at about 82°F and cured at 90°–120°F for about 3 days.

The finished propellant has the following properties:

| Mechanical Properties | 77°F | 110°F |
|---|---|---|
| Elongation, % | 91 | 77 |
| Modulus of Elasticity, psi | 529 | 430 |
| Maximum stress, psi | 143 | 114 |

EXAMPLE III

A solid propellant was prepared having the same formulation as the one in Example II, except polypropylene glycol was used instead of the B-500 sebacate diol.

The cured propellant has the following properties:

| Mechanical Properties | 77°F | 110°F |
|---|---|---|
| Elongation (at maximum stress), % | 27 | 21 |
| Modulus of Elasticity, psi | 1162 | 1103 |
| Maximum stress, psi | 153 | 143 |

This data indicates that propellants made with polypropylene glycol diol exhibit lower elongations and higher moduli of elasticity than propellants made with B-500 sebacate diol.

The solid propellants of this invention, due to the use of either 1,2-polyoxybutylene glycol or one of its hydroxy-terminated polyester derivatives as the polymeric component of the binder, combine the properties of high elongation and low modulus of elasticity and thus are particularly useful in large rocket motors. These properties enable the propellant to withstand temperature and pressure changes without cracking and breaking away from the rocket case wall.

Obviously many modifications and variations of the present invention are possible in the light of the above teachings. It is therefore to be understood, that within the scope of the appended claims, the invention may be practiced otherwise than as specifically described.

What is claimed is:

1. A composition capable of being cast and cured into a solid propellant comprising:
    a. an organic compound having as its sole reacting groups two isocyanate groups,
    b. a member selected from the hydroxy-terminated polyesters formed by condensing an alkanedioic acid with 1,2-polyoxy-butylene glycol,
    c. a crosslinking agent, and
    d. a solid oxidizer.

2. The composition of claim 1 wherein the organic compound is an organic diisocyanate selected from the group consisting of substituted and unsubstituted alkane, alkene, alkylidene, cycloalkylene, cycloalkylidene, aromatic, alkane ether, pyridine and nitrazaalkylene diisocyanates.

3. The composition of claim 2 wherein member (b) is a hydroxy-terminated polyester formed by condensing sebacic acid with 1,2-polyoxybutylene glycol.

4. The composition of claim 3 wherein the organic compound is toluene-2,4-diisocyanate.

5. The composition of claim 3 wherein the organic compound is 3-nitrazapentane-1,5-diisocyanate.

6. The composition of claim 3 wherein the organic compound is 1,6-hexane diisocyanate.

7. The composition of claim 3 further including a solid fuel.

8. The composition of claim 7 wherein the solid oxidizer is ammonium perchlorate and the solid fuel is aluminum.

9. A solid propellant of the composite type comprising from about 45–95 weight percent of a solid oxidizer and from about 5–55 weight percent of a crosslinked polyurethane binder, said polyurethane being the reaction product of an organic compound having as its sole reacting groups two isocyanate groups and a member selected from the hydroxy-terminated polyesters formed by condensing 1,2-polyoxybutylene glycol with an alkanedioic acid.

10. The propellant of claim 9 wherein said organic compound is an organic diisocyanate selected from the group consisting of substituted and unsubstituted alkane, alkene, alkylidene, cycloalkylene, cycloalkylidene, aromatic, alkane ether, pyridine and nitrazalkylene diisocyanates.

11. The propellant of claim 9 wherein said member is a hydroxy-terminated ester formed by condensing 1,2-polyoxybutylene glycol with sebacic acid.

12. The propellant of claim 11 wherein the organic compound is toluene-2,4-diisocyanate.

13. The propellant of claim 11 wherein the organic compound is 3-nitrazapentane-1,5-diisocyanate.

14. The propellant of claim 11 wherein the organic compound is 1,6-hexane diisocyanate.

15. The propellant of claim 11 wherein the binder contains a solid fuel.

16. The propellant of claim 15 wherein the solid oxidizer is ammonium perchlorate and the solid fuel is aluminum.

17. A purpose for preparing a solid propellant of the composite type comprising:
   a. blending a member selected from the hydroxy-terminated polyesters formed by condensing 1,2-polyoxybutylene glycol with an alkanedioic acid with a crosslinking agent,
   b. blending a solid oxidizer into the mixture of (a),
   c. blending an organic compound having as its sole reacting groups two isocyanate groups into the mixture of (b), and
   d. curing mixture (c).

* * * * *